United States Patent
Peterson (10) Patent No.: US 7,583,325 B2
(45) Date of Patent: Sep. 1, 2009

(54) PROJECTION SYSTEMS AND PROCESSES FOR GENERATING IMAGES WITH INCREASED BRIGHTNESS UNIFORMITY

(75) Inventor: Mark D. Peterson, Lake Oswego, OR (US)

(73) Assignee: InFocus Corporation, Wilsonville, OR (US)

( * ) Notice: Subject to any disclaimer, the term of this patent is extended or adjusted under 35 U.S.C. 154(b) by 626 days.

(21) Appl. No.: 11/089,757

(22) Filed: Mar. 23, 2005

(65) Prior Publication Data
US 2006/0215127 A1 Sep. 28, 2006

(51) Int. Cl.
H04N 9/31 (2006.01)
H04N 9/77 (2006.01)

(52) U.S. Cl. ............ 348/745; 348/806; 348/687; 348/671; 348/750; 348/771; 348/795; 345/77; 345/690

(58) Field of Classification Search ........... 348/745, 348/744, 750, 751, 758, 771, 795, 785, 806, 348/687, 671, 673; 353/69; 349/5, 7; 345/690, 345/89, 90, 77
See application file for complete search history.

(56) References Cited

U.S. PATENT DOCUMENTS

| | | | |
|---|---|---|---|
| 5,808,800 A * | 9/1998 | Handschy et al. | 359/630 |
| 6,663,244 B1 | 12/2003 | Wichner et al. | |
| 6,804,055 B2 | 10/2004 | Peterson et al. | |
| 6,883,917 B2 | 4/2005 | Wichner et al. | |
| 6,896,375 B2 | 5/2005 | Peterson et al. | |
| 6,985,127 B1 * | 1/2006 | Russell et al. | 345/89 |
| 7,055,959 B2 * | 6/2006 | Wada et al. | 353/77 |
| 7,131,736 B2 * | 11/2006 | Bierhuizen | 353/98 |
| 7,167,645 B2 * | 1/2007 | Matsuda et al. | 396/213 |
| 7,170,535 B2 * | 1/2007 | Matsuda | 345/690 |
| 7,180,554 B2 * | 2/2007 | Divelbiss et al. | 348/742 |
| 7,266,240 B2 * | 9/2007 | Matsuda | 382/167 |
| 2004/0196303 A1 | 10/2004 | Matsuda | |
| 2004/0196304 A1 | 10/2004 | Lee | |
| 2004/0207818 A1 | 10/2004 | Stahl | |
| 2005/0017990 A1 | 1/2005 | Yoshida | |

* cited by examiner

*Primary Examiner*—David L Ometz
*Assistant Examiner*—Jean W Désir
(74) *Attorney, Agent, or Firm*—Schwabe Williamson & Wyatt (57) ABSTRACT

Apparatuses and processes for generating images having increased brightness uniformity are disclosed herein.

17 Claims, 6 Drawing Sheets

Prior Art

PROJECTION SYSTEMS AND PROCESSES FOR GENERATING IMAGES WITH INCREASED BRIGHTNESS UNIFORMITY

FIELD OF THE INVENTION

Embodiments of the invention relate generally to the field of projection systems, and more particularly to image signal processing in projection systems.

BACKGROUND OF THE INVENTION

Rear projection systems are currently one of the most popular types of large-screen display systems that are widely available to the general public. In order to generate images, these projection systems will typically employ a spatial light modulator such as a light valve. A light valve will typically employ a dense array of valvelets, each of the valvelets may contribute to the formation of image portions.

As described, a valvelet is typically used to generate a portion ("image segment") of an image, the portion generated may include a pixel, or a plurality of pixels of the image to be produced. In order to generate image segments, each valvelet may be manipulated into at least two orientations, an "on" orientation, in which light is either passed or reflected to the display screen, or in the "off" orientation, in which case no light is allowed to pass or reflected to the display screen such as pulse width modulation control scheme (usually associated with MEMS devices like the DMD). By controlling the number of times a valvelet is oriented in the "on" position per unit of time, the brightness of the image segment being generated may be controlled. The more often a valvelet is in the "on" orientation per unit of time, the brighter the corresponding image segment will be. In analog control scheme (usually associated with liquid crystal device (LCD) and liquid crystal on silicon device (LCOS)) the device can be partially turned on and thus transmit only a portion of the light. The valvelet can control the percentage of light transmitted or reflected to the screen. When combined, the resulting image segments produced by these valvelets will form an image frame that is eventually projected onto a display screen. The image frames formed, in some instances, may be single color image frames that may be associated with the primary colors of red, green and blue. When these single color image frames are projected onto and combined on the display screen, they may form one or more full color images.

The variations in brightness of an image segment projected onto a display screen, in this context, can vary from full color when valvelets are in the "on" orientation the maximum number of times or the maximum transmission possible per unit of time, to black, when the valvelets are left in the "off" orientation. For simplicity, variation between full color and black for any one color is defined as different shades of "gray". For example, in an 8-bit video image, there may be 256 shades of gray from full color to black. These different shades of gray may correspond to the number of times (i.e., counts) a valvelet can be in the "on" position per unit time period or the percentage of maximum transmission or reflection in the case of an analog drive. In an 8-bit video, shades of gray may range from full color when the count is at a maximum of 255 to black when the count is 0. Note that other video formats will have different ranges of gray. For example, in contrast to the 256 shades associated with 8-bit video image, a 10-bit video image can have 1024 shades of gray. For purposes of this description, the number of times (i.e., counts) that a valvelet is in the "on" orientation per unit of time or the percentage of full transmission/reflection will be referred to as the "grayscale value." Thus, for the shade representing the maximum white or full color, the grayscale value would be 255.

Figure 1A:
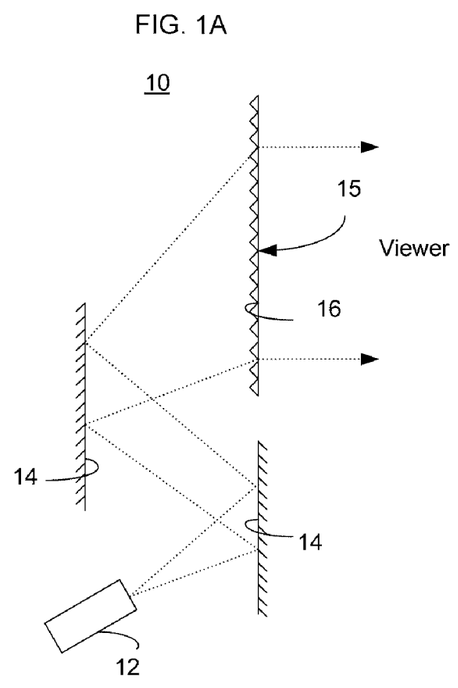
FIG. 1A illustrates a projection system that includes a Fresnel lens.

FIG. 1A depicts a projection system employing a particular type of Fresnel lens, which is disposed on the back of a display screen 15. The type of Fresnel lens 16 that is depicted here extends across the entire length of the display screen 15 and contains many grooves that act to redirect light that is projected onto the lens 16 at sharp angles to the viewer. The system 10 includes an image source 12 that generates one or more images that are directed to a series of mirrors 14. The one or more images are then eventually projected onto the Fresnel lens 16 (i.e., display screen 15), which redirects the one or more images to the viewer via the display screen 15. The image source 12 typically includes a number of components such as a light valve, one or more illumination sources such as an arc lamp and/or light-emitting diodes (LEDs), and assorted lens and mirrors.

Figure 1B:
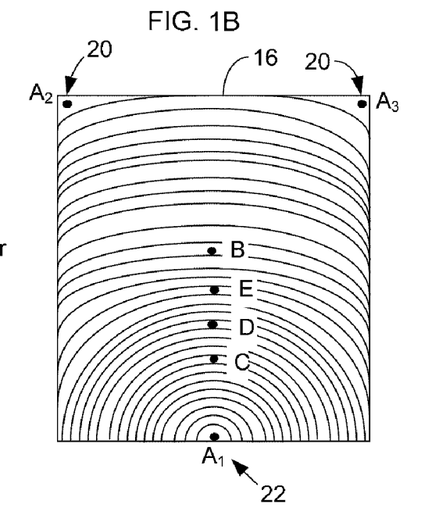
FIG. 1B illustrates a front view of the Fresnel lens of FIG. 1A.

FIG. 1B is a plan view of the Fresnel lens 16 of FIG. 1A. In this illustration, the display screen 15 is located on the backside of the Fresnel lens 16. As can be seen, the grooves form concentric semicircles. The letters $A_1, A_2, A_3$, B, C, D, and E indicates various locations or positions on the Fresnel lens 16 (as well as on the display screen 15). These lens or screen locations will also be associated with specific valvelets of a light valve or valves that may be used to produce the image segments to be projected onto these locations.

Figure 1C:
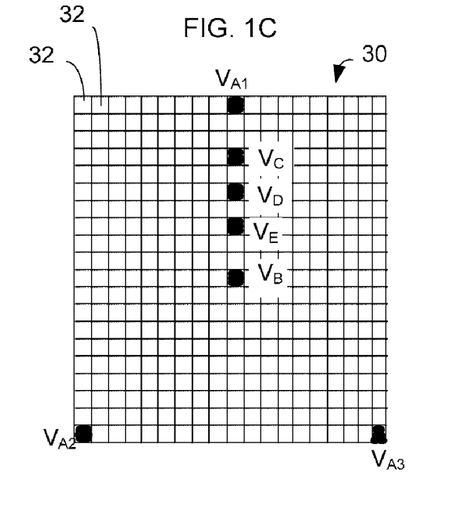
FIG. 1C illustrates an array of valvelets that is used to project an image onto the Fresnel lens of FIG. 1B.

FIG. 1C depicts an example array of-valvelets on a light valve that may be used to project image segments onto the Fresnel lens 16 of FIG. 1B. Note that the valvelet array 30 is not depicted to scale as it relates to the Fresnel lens 16 and will be typically much smaller than the Fresnel lens 16 depicted in FIG. 1B. Note further that a typical valvelet array will include many more valvelets than the amount depicted in FIG. 1C. Valvelet $V_{A1}$, $V_{A2}$ and $V_{A3}$ corresponds to the valvelets that are used to generate the image segments that are projected onto the Fresnel lens (or screen) locations designated as $A_1$, $A_2$, and $A_3$ in FIG. 1B. Similarly, $V_B$, $V_C$, $V_D$, and $V_E$ correspond to the valvelets that are used to generate the image segments that are projected onto the locations designated as B, C, D, and E in FIG. 1B.

One problem associated with current projection systems, such as the one depicted above, is the brightness nonuniformity of images that are projected onto the display screens. This may be as a result of several factors including the presence of certain components along the optical paths of the projection systems. For example, the use of a projection lens or other similar devices may result in lower than desired brightness for certain segments of the image to be projected onto the display screen due to vignetting in the lens and lower transmission for light reflected/transmitted from the valvelets farthest from the optical axis of the projection lens. For example, in rear projection systems that employ a diffusion screen without a Fresnel lens, certain portions of the image to be generated will be darker or dimmer than ideal due to, for example, higher surface reflections at various locations of the display screen. In these projection systems, some light is lost from some of the image segments before the image segments are actually transmitted through the display screen and to the viewer. Typically these darker or dimmer regions may be associated with, for example, the corner regions of the image or images to be generated on the display screen (see ref. 20). Consequently, these dimmer regions can also be associated with specific locations on the display screen (e.g., corner locations of the screen). In one case where Fresnel lenses of a particular design is employed, a dim region will also be present at the bottom center of the display screen (see refs. 22). Thus, the dimness of a specific image region will be dependent upon several factors including the type of components being used (e.g., type of Fresnel lens employed) and its location relative to the display screen 15.

In FIG. 1B, the locations $A_1$, $A_2$, $A_3$, B, C, D and E are screen locations that are associated with varying darkness or dimness for a particular type of Fresnel lens 16. In this example, the letters $A_1$, $A_2$, and $A_3$ corresponds to the locations (on the Fresnel lens 16 as well as on the display screen 15) where the darkest image regions will be located. Letters C, D, and E correspond to the screen positions that are associated with image regions that are, in terms of brightness, between the darkest region ($A_1$) and the brightest region (B). As a result of this brightness nonuniformity, the image or images that are projected onto the display screen will be less than ideal. For example, suppose in the case of the above system, two image segments of an image having the same brightness are to be projected onto two different screen locations. However, as a result of brightness non-uniformity between the two screen locations, the actual image segments produced at those two screen locations will have unequal brightness. This may result in the overall brightness nonuniformity of the image to be generated.

At this time, it should be noted that there are other types of Fresnel lens other than the Fresnel lens 16 depicted above. These other Fresnel lens types will typically have different topography of contrasting dimness and brightness then the dimness and brightness depicted above for Fresnel lens 16. For example, in one type of Fresnel lens, the region $A_1$ in Fresnel lens 16 (which was one of darkest regions on the lens) may not be the darkest region for the same corresponding region of another type of Fresnel lens. In fact, in other types of Fresnel lens, the exact distribution of darkest and lightest regions may be completely different from those of the Fresnel lens 16 depicted above in FIG. 1B. In such Fresnel lens, the brightest location (such as location B on Fresnel lens 16 above) may be located in other locations such as at locations corresponding to locations C or D of Fresnel lens 16 depicted above. In yet other types of Fresnel lens, there may not be a central dark region as depicted in FIG. 1B (see $A_1$).

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include processes and apparatuses for adjusting an image signal and generating images with improved brightness uniformity on a display screen.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

According to various embodiments of the invention, processes and apparatuses for generating images with increased brightness uniformity are provided. For the embodiments, a first image signal containing one or more individual image frame signals may be received by a projection system. The one or more image frame signals may be used to form one or more individual image frames and may further include grayscale values for valvelets of a light valve. The grayscale values may be used to control their corresponding valvelets to generate image segments. The generated image segments, when combined, may form a complete image frame that may be projected onto a display screen. As a result, each of the image segments may be associated with specific screen locations on the display screen, the screen locations being located at specific positions on the screen.

In various embodiments, the screen locations may be associated with varying dimness. Dimness, as defined here, relates to the amount of light that may be lost when, for example, light travels from a light valve to a display screen. In some instances the varying dimness of various screen locations may be as a result of vignetting or surface reflection.

After receiving the first image signal, the projection system may process the first image signal to adjust one or more of the grayscale values contained in the first image signal. The adjustment of the one or more grayscale values may be performed in order to compensate for the varying dimness associated with various screen locations. In some instances, this adjustment may be accomplished by applying one or more compensation or correction factors to the one or more grayscale values contained in the first image signal. A second image signal with the one or more adjusted grayscale values may then be generated and used to control a light valve containing one or more valvelets. By controlling the light valve with the second image signal, one or more images with increased brightness uniformity may be generated on the display screen.

Figure 2:
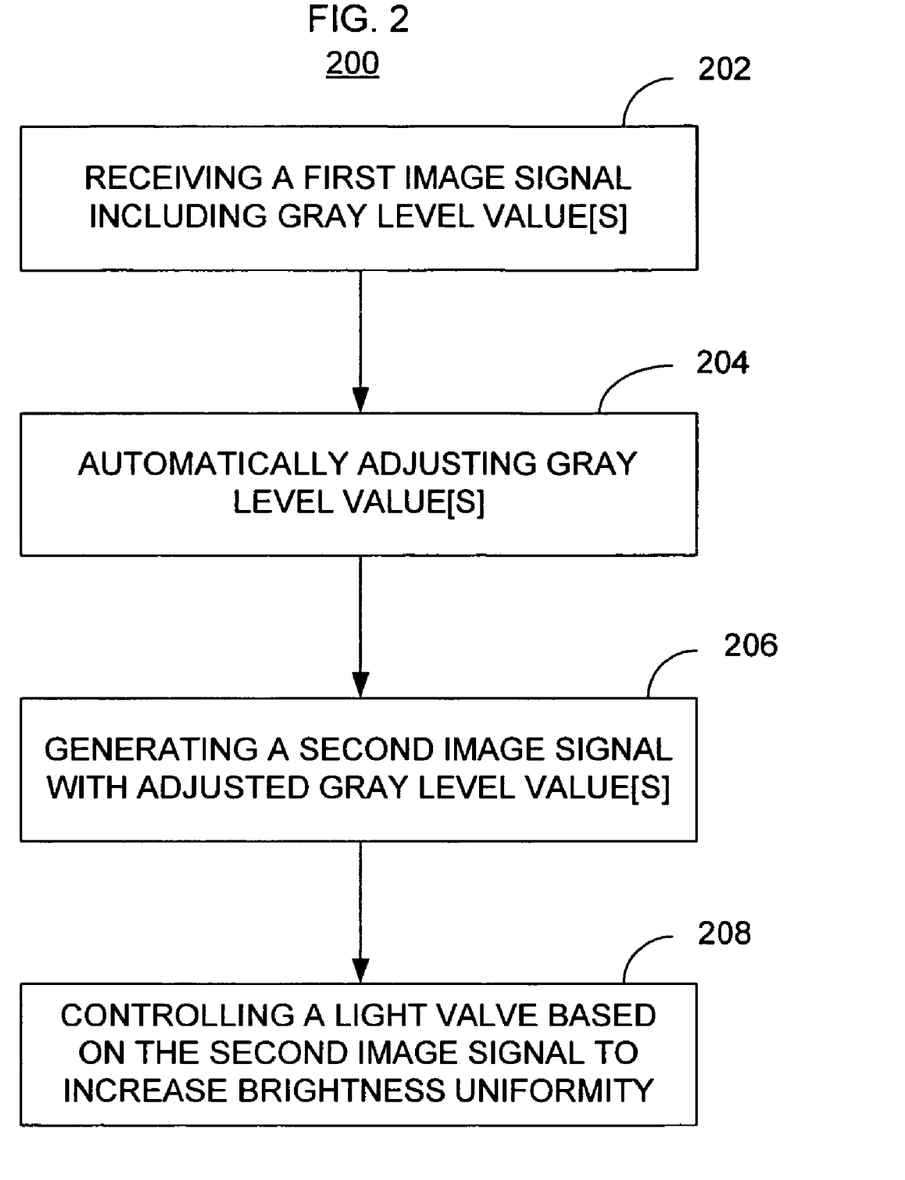
FIG. 2 illustrates a process for generating one or more images with increased brightness uniformity in accordance with some embodiments of the invention.

FIG. 2 depicts a process for generating one or more images having increased brightness uniformity in accordance with some embodiments. The process 200, in some embodiments, may be implemented using, for example, a projection system 300 such as the one depicted in FIG. 3. In various embodiments, the projection system 300 may include an image processor 302, a display device 304 that includes a controller 310 and light valve 312, an illumination arrangement 306, a projection lens 308, and a display screen 309. The image processor 302, in some embodiments, may be used to preprocess an image signal received by the projection system 300. The controller 310, in some embodiments may receive the preprocessed image signal from the image processor 302 and drive the light valve 312.

Figure 3:
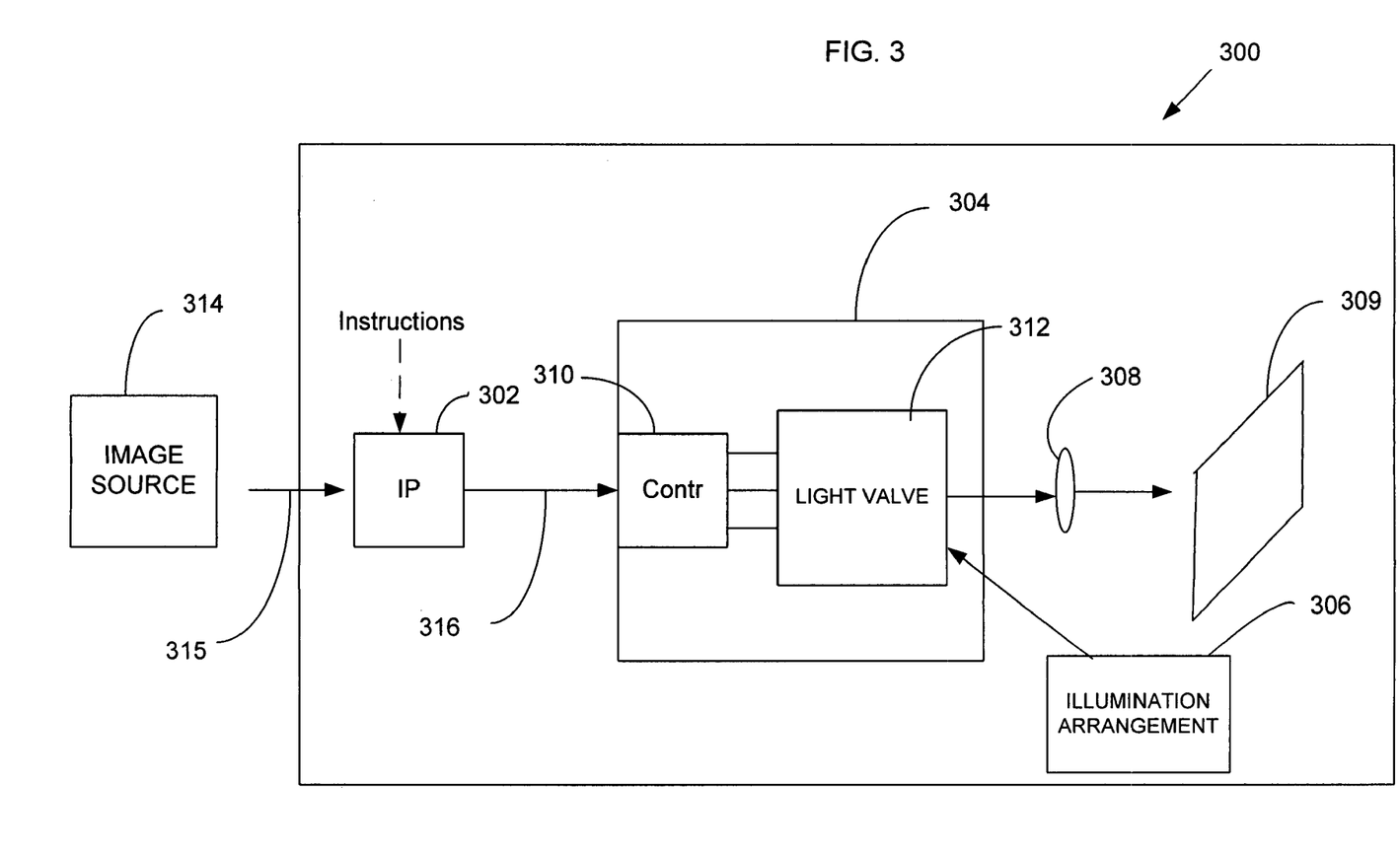
FIG. 3 illustrates a projection system for generating one or more images with increased brightness uniformity in accordance with some embodiments.

The light valve 312 may be a light modulator such as a digital micromirror device (DMD), a liquid crystal on silicon device (LCOS), a liquid crystal device (LCD), or other light modulators. The projection lens 308 may actually include a plurality of lenses. The illumination arrangement 306, which projects light to the light valve 312, may include various optics such as lenses and mirrors, integrating tunnels, x-cube, color wheel, and one or more light sources such as light-emitting diodes (LEDs), laser diodes, arc lamps, high intensity discharge lamps (HID) and the like. The display screen 309, in various embodiments, may include a Fresnel lens.

Returning to FIG. 2, the process 200 may begin when a first image signal is received by an image processor 302 at block 202. The first image signal (see ref. 315), may be generated by an image signal source 314 such as a personal computer (PC), a DVD player, a VCR, or other devices. Although not depicted, in some embodiments, the first image signal may be provided through an electronic network such as the Internet, local area network (LAN), wide area network (WAN), and/or though other networks. The first image signal may be made up of a plurality of image frame signals, each image frame signal containing data for generating an image frame. The image frame generated may, in some instances, be a single color image frame that when combined with other single color image frames form a full color image. The data contained in an image frame signal may include grayscale values used to control valvelets of a light valve 312. In various embodiments, a grayscale value may define the percentage of transmission or reflection of the valvelet or the number of times a valvelet is in the "on" orientation for a particular time period. Thus, the grayscale values contained in a single image frame signal may be used to control the formation of a single image frame.

Upon receiving the first image signal, the image processor 302 may be adapted to automatically adjust one or more of the grayscale values contained in the first image signal at block 204. In some embodiments, the adjustment may be performed by applying one or more variable or non-variable adjustment or correction factors to the one or more grayscale values. The application of a variable or non-variable adjustment factor to a grayscale value may be accomplished by, for example, multiplying or dividing the grayscale value with a variable or nonvariable adjustment factor. For example, for a particular valvelet, the adjustment factor that is applied to the grayscale values associated with that valvelet may or may not be variable from one image frame signal to the next image frame signal. That is, each image frame signal contained in the first image signal may further contain a grayscale value that is associated with a particular valvelet and a particular screen location. The adjustment factors that may be applied to the grayscale values associated with the same valvelet may vary from one image frame signal to the next image frame signal. Further, within a single image frame signal, adjustment factors that may be applied to different grayscale values associated with different valvelets may or may not vary. In some embodiments, the adjustment factors that are applied to the grayscale values may be adjusted gamma corrections. The adjusted gamma corrections are known by those of ordinary skill in the art and will be described in brief below.

After the grayscale values in the first image signal has been adjusted, the image processor 302 may generate a second image signal, which may be sent to the display device 304 at block 206. At the display device 304, the controller 310 may initially receive the adjusted second image signal 316 and may control or drive the light valve 312 based on the adjusted second image signal. Based on the adjusted grayscale values contained in the second image signal, one or more of the valvelets that may be included in the light valve 312 may be controlled so that better brightness uniformity may be obtained in the image or images that are projected onto the display screen 309 at block 208.

Figure 4A:
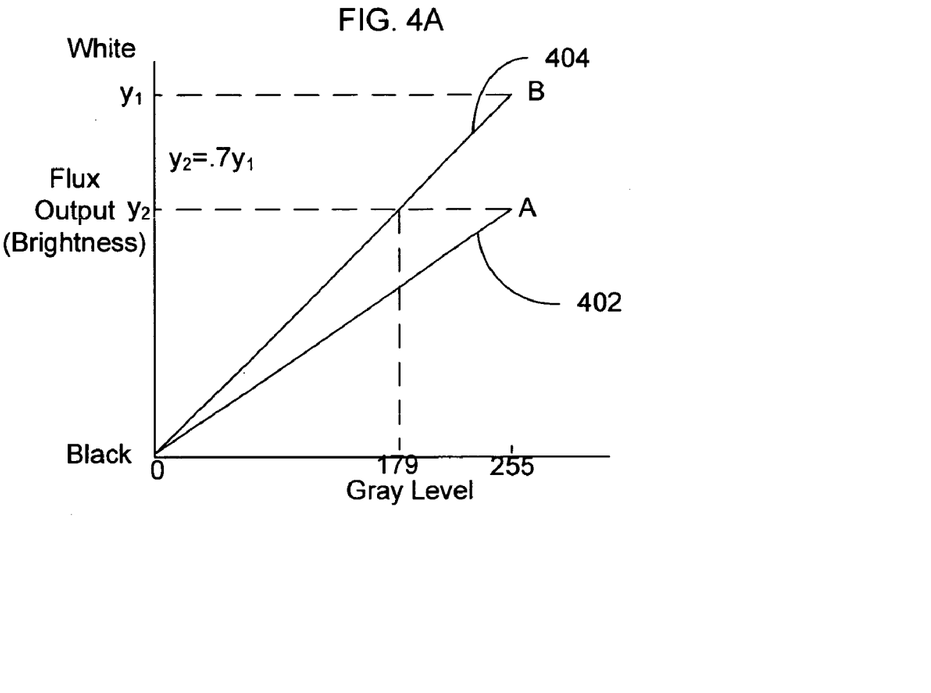
FIG. 4A illustrates a graphical representation of the flux output for two screen locations depicted in FIG. 1B when grayscale values associated with the two locations are not adjusted to increase brightness uniformity between the two screen locations.

In order to appreciate certain novel aspects of the embodiments of the invention, the following initially describes the flux output of a conventional projection system such as the one illustrated in FIGS. 1A to 1C. In such a conventional projection system, the inputted first image signals received by the projection system are not adjusted in order to compensate for dimness variations associated with different screen locations. As a result, brightness nonuniformity may occur in the resulting images that may be produced by the projection system. In particular, FIG. 4A is an example graphical representation of the flux outputs (i.e., brightness) produced by a conventional projection system at screen locations $A_1$ and B of FIG. 1B at various grayscale values. The two lines 402 and 404 depicted represent the flux output (herein "output") as seen, for example, by a viewer for the two screen locations $A_1$ and B (of FIG. 1B) when different grayscale values are applied to control the two valvelets $V_{A1}$ and $V_B$ that are associated with the two screen locations $A_1$ and B. The variation of grayscale value of a particular valvelet associated with a particular screen location may occur in many situations. For example, this type of situation may occur when video images are being displayed using a plurality of image frame signals, each image frame signal, in this context, may be used to form a single image frame. Each of the plurality of image frame signals may contain a plurality of grayscale values for the same image segment (e.g., screen location) resulting in the image segment appearing to change over a time period.

In this graph, the vertical axis represents flux output as seen by the viewer (brightness) associated with specific screen locations (e.g., screen locations $A_1$ and B) while the horizontal axis represents the grayscale values employed for the corresponding valvelets $V_{A1}$ and $V_B$ that are used to generate the flux output at those screen locations. Ideally, if brightness uniformity exists between the two screen locations $A_1$ and B, then the flux output for both screen locations $A_1$ and B will be the same when the grayscale values are the same for the associated valvelets $V_{A1}$ and $V_B$. That is, in the ideal case, the output lines 402 and 404 for both screen locations $A_1$ and B would track each other. Notice, however, that throughout the entire range of grayscale values, location $A_1$'s brightness is significantly lower than location B's brightness.

Figure 4B:
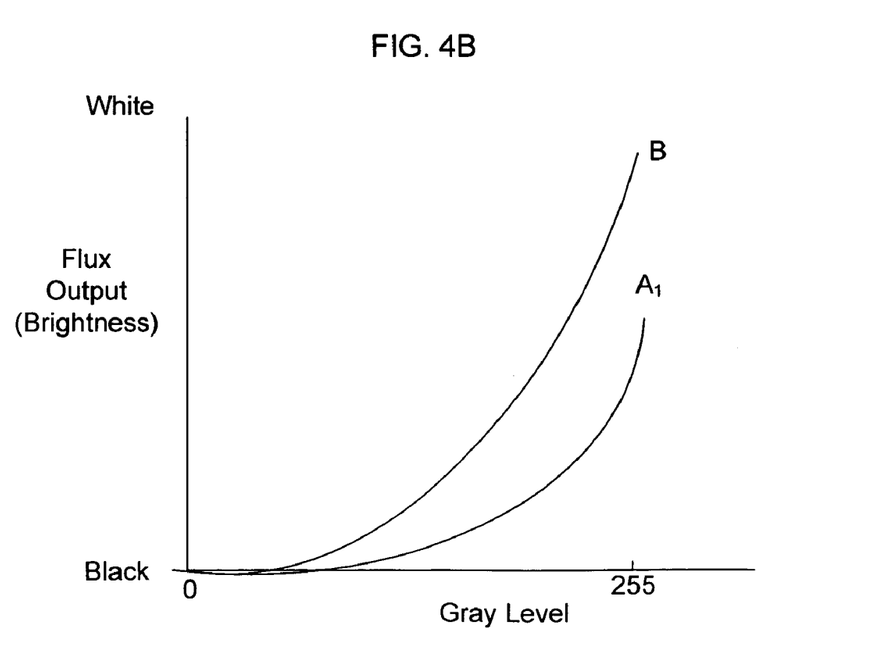
FIG. 4B illustrates nonlinear relationships between grayscale values and flux outputs for the two screen locations of FIG. 4A.

In fact, when the grayscale values are 255 for the two screen locations $A_1$ and B, the brightness of screen location $A_1$ is, for example, 30 percent less than the brightness of screen location B ($y_2=0.7y_1$). In other words, when valvelet $V_{A1}$, which is associated with screen location $A_1$, is controlled with its maximum grayscale value of 255, the flux output produced at screen location $A_1$ is the same as screen location B when valvelet $V_B$ for location B is controlled with a grayscale value of, for example, 179. Note that due to gamma correction and white and black level clipping, this value of 179 may not be exactly 30% less light then the full 255. At this point, it should be further noted that although the two outputs 402 and 404 are depicted by straight lines spanning the grayscale values, in actuality, the two outputs 402 and 404 will typically be nonlinear, spanning the grayscale values(as depicted in FIG. 4B). However, for purposes of simplicity, the two outputs 402 and 404 are depicted as being linear over the grayscale values. Nonetheless, because of the brightness non-uniformity between various screen locations such as the two screen locations $A_1$ and B depicted in FIGS. 1B and 4A, the resulting images generated will be less than ideal.

Figure 5A:
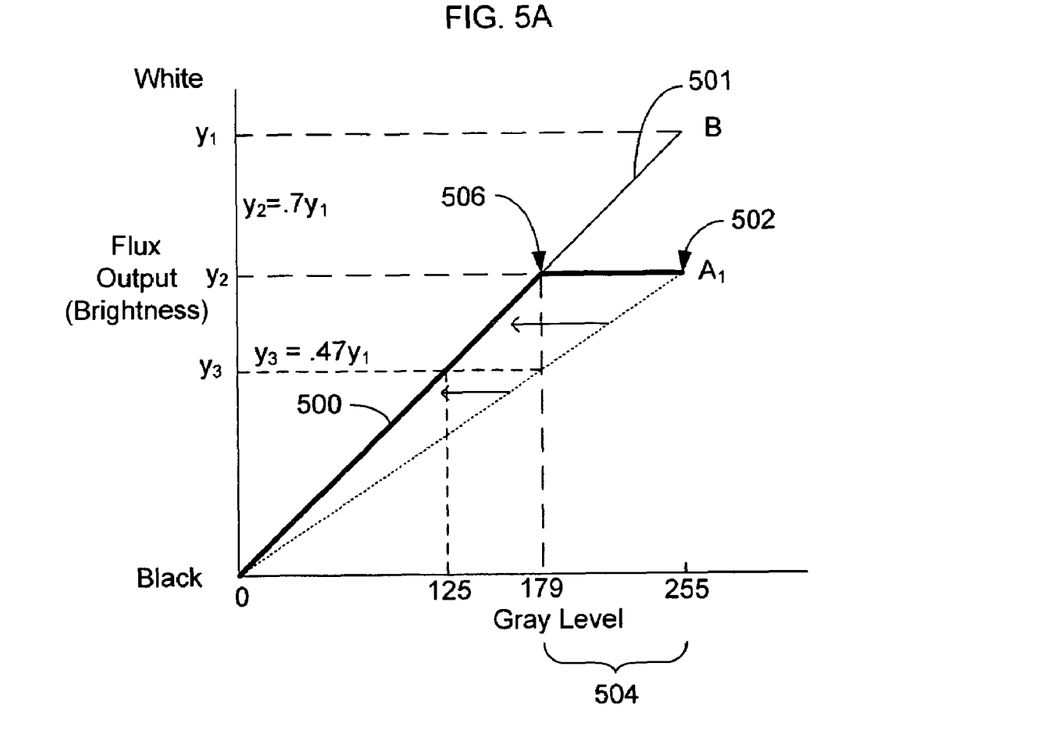
FIG. 5A illustrates a graphical representation of the flux output of the two screen locations of FIG. 4A when grayscale values associated with one of the screen locations are adjusted or scaled to increase brightness uniformity between the two screen locations in accordance with some embodiments.

FIG. 5A depicts an example graphical representation of the output lines of screen locations $A_1$ and B of FIG. 1B after adjusting or correcting the grayscale values associated with valvelet $V_{A1}$ in accordance with some embodiments of the invention. For these embodiments, at least a portion of the output line 500 for screen location $A_1$ has been shifted to the left (the location of the original output line for screen location $A_1$ is indicated by the dotted line) and is on top of at least a portion of the output line 501 for screen location B. The shifting of the output line 500 for screen location $A_1$ may be accomplished by adjusting each of the original grayscale values for valvelet $V_{A1}$ to provide adjusted grayscale values for corresponding brightness. These adjustments, in some instances, may be accomplished by applying (e.g., multiplying or dividing) a variable or nonvariable adjustment factor to each of the original grayscale values associated with valvelet $V_{A1}$. In this case where the brightness at $A_1$ may be a constant 30% less than the brightness at B and the response curves are linear, the grayscale values for valvelet $A_1$ are divided by the constant factor 0.7.

In this case, when the grayscale value for valvelet $V_B$ is at 179 (which is about 70 percent of the maximum 255), the grayscale value for valvelet $V_{A1}$ needed to generate the same brightness as valvelet $V_B$ (at grayscale value of 179) will be 255. Similarly, when the grayscale value for valvelet $V_B$ is at 125, the grayscale value for valvelet $V_{A1}$ needed to generate the same brightness as valvelet $V_B$ (at grayscale value of 125) will be 179. Note that once the grayscale value of 255 (as indicated by reference 502) is reached for $V_{A1}$, the brightness associated with location $A_1$ cannot be raised any further. Thus, brightness nonuniformity may occur on the right side of the graph (e.g., grayscale values greater than 179 for $V_B$ and 255 for $V_{A1}$ as indicated by ref. 504). Therefore some embodiments of the invention may be particularly useful for applications that do not require high brightness such as video, imaging (e.g. video content for movies).

As described above, in order to shift or scale the output line of screen location $A_1$ to the left, adjustment factor or factors may be applied to each of the grayscale values associated with the output line for screen location $A_1$. As defined here, "applying" means to process the grayscale values by, for example, multiplying or dividing each grayscale value associated with the output line by an adjustment factor or factors. For example, in FIG. 5A, the adjustment factor used to move the point on the output line at 506 to the new point at 502 would be 255/179 (=1.42) or 179/255 (=0.70) depending on whether the grayscale value being adjusted is being multiplied or divided by the adjustment factor.

By applying the proper adjustment factor or factors to each point along the output line 500 for screen location $A_1$, at least a portion of the $A_1$ output line can be shifted to the left overlapping on top of the screen location B's output line 501. In terms of signal processing, this can be accomplished by applying the appropriate adjustment factor or factors to one or more of the grayscale values (for valvelet $V_{A1}$) contained in the input image signal prior to sending the image signal to the display device containing the light valve. For example, in the above example, when the input image signal contains a grayscale value of 179 for valvelet $V_{A1}$, that input image signal may be preprocessed to convert that grayscale value from 179 to 255. A second image signal with the adjusted grayscale value may then be sent to the display device containing the light valve.

Note that in the examples described herein, the examples are simple examples where a constant multiplier was used. However, in actual implementations, the multiplication factor may be a function of the valvelet's first image grayscale value. In some embodiments, the adjustment factor or factors used to shift or scale an output line for specific screen locations may be an adjusted gamma correction factor or factors. In brief, a gamma characteristic is a power law relationship that approximates the relationship between the encoded luminance in a television system and the actual desired image brightness. Gamma correction, on the other hand, is used to account for this nonlinear relationship. Some systems such as computer graphics systems that require a linear relationship between these quantities may use gamma correction to account for the nonlinear relationship between the quantities. For example, the straight lines depicted in FIG. 4A may actually look like the nonlinear graph depicted in FIG. 4B.

In various embodiments, a gamma correction that is adjusted to further account for differences in dimness between different screen locations may be used as the adjustment factor. Note that the adjusted gamma correction that may be used with a grayscale value may vary depending on several factors including, for example, whether the light being processed is red, green, or blue light.

Figure 5B:
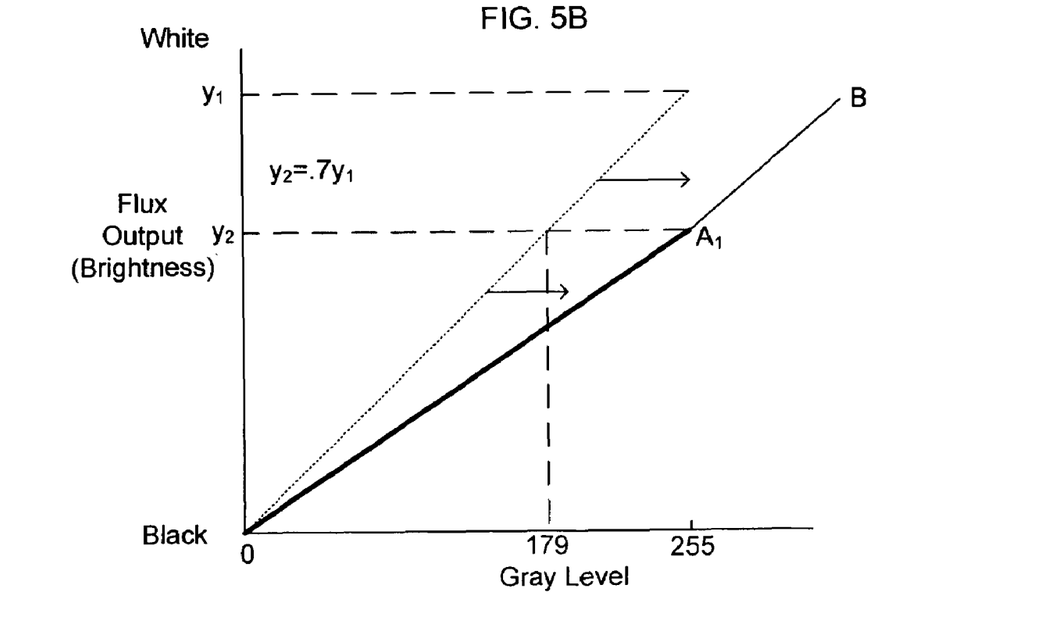
FIG. 5B illustrates a graphical representation of the flux output lines of the two screen locations of FIG. 4A when grayscale values associated with one of the screen locations are adjusted or scaled to increase brightness uniformity between the two screen locations in accordance with some embodiments.

In alternative embodiments, rather than shifting or scaling the output line for screen location $A_1$ to the left as depicted in FIG. 5A, the output line for screen location B may be moved to the right to overlap on top of the output line for screen location $A_1$ as depicted in FIG. 5B. This may be accomplished by applying adjustment factor or factors to each of the grayscale values associated with each of the points that lie along the output line for screen location B. As a result, the screen location B output line is shifted or scaled to the right. The adjustment factor or factors, in this case, may be the inverse of the adjustment factor or factors used to move the output line for screen location $A_1$ to the left in FIG. 5A. In this case there may be no way to reach maximum brightness for location B because the input data for the second (modified) image cannot have grayscale values greater then 255, however the brightness uniformity may be sufficiently good. In both of the examples depicted in FIGS. 5A and 5B, at least one of the output lines for the two screen locations is scaled up or down in order to make at least portions of the two output lines overlap.

Figure 5C:
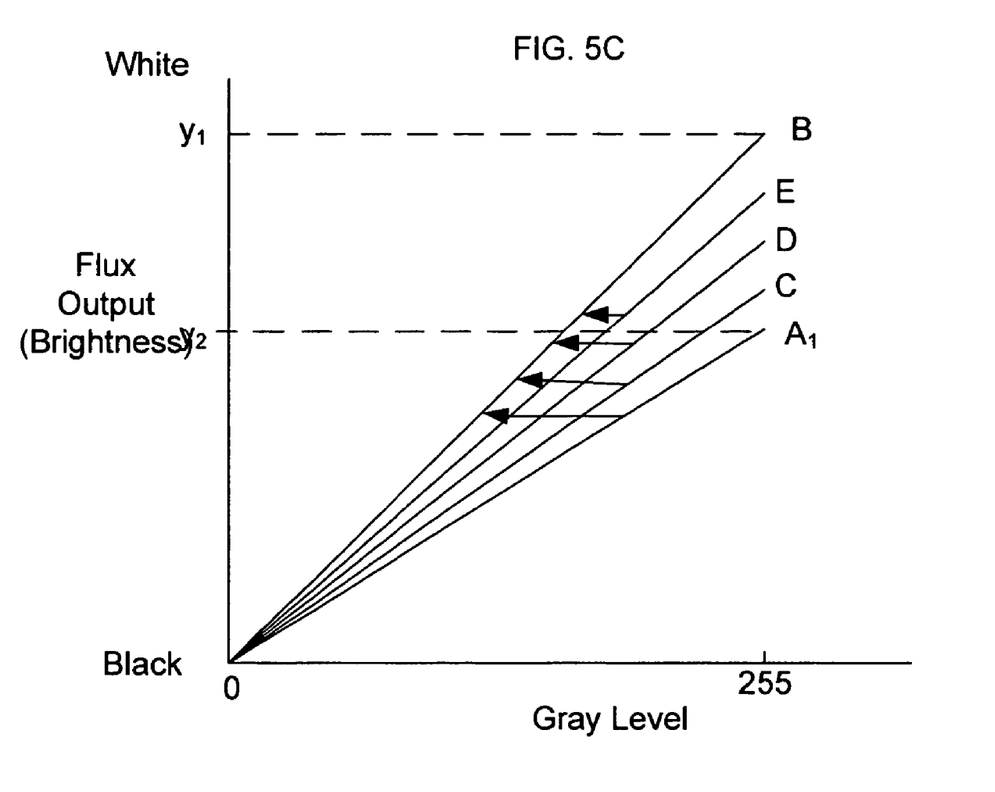
FIG. 5C illustrates a graphical representation of the flux output lines of a plurality of screen locations of FIG. 4A when grayscale values associated with some of the screen locations are adjusted or scaled to increase brightness uniformity between the screen locations in accordance with some embodiments.

FIG. 5C is a graphical representation of the output lines for multiple screen locations (see screen locations $A_1$, $A_2$, $A_3$, B, C, D and E as depicted in FIG. 1B). In this example, each of the output lines for screen locations $A_1$, C, D, and E may be shifted or scaled to the left so as to overlap on top of screen location B's output line. As briefly described earlier, the screen locations that are located between the brightest screen location B and the dimmest screen location $A_1$ in FIG. 1B may have varying levels of dimness. In this example, the closer a screen location (e.g., C, D, or E) is to screen location $A_1$ (or $A_2$ and $A_3$), the dimmer or darker that screen location may be. For example, screen location C will be darker or dimmer than screen location D since screen location C is closer to screen location $A_1$. Consequently, for each image frame signal, different adjustment factors may be applied to each of the grayscale values associated with the different screen locations (e.g., screen locations $A_1$, C, D, and E) in order to obtain brightness uniformity.

In view of the above description and FIG. 5C, it should be apparent to those of ordinary skill in the art that the selection of the grayscale values to be adjusted in order to achieve brightness uniformity may be somewhat arbitrary. For example, in other embodiments, the output lines for screen locations B, E, D, and C may be shifted or scaled to the right so that they may partially overlap on top of the output line for screen location $A_1$. In yet other embodiments, the output lines for screen locations $A_1$, B, C, and E may be shifted or scaled so that they at least partially overlap on top of the output line for screen location D. Clearly, many other variations are possible in other embodiments of the invention. The locations $A_1$, C, D, E, may also be scaled a fraction of the difference to B to marginally improve brightness uniformity. This may be a compromise between uniformity and brightness.

Again, it should be noted that the types of images displayed by the types of projectors described above will be moving or dynamic images such as those of video images. Consequently, the image signals that are received by the projection system may include a plurality of image frame signals, each image frame signal used to generate a single image frame on the display screen. Each of the image frame signal may further include a plurality of grayscale value for valvelets corresponding to a pixel or a segment of a image frame. Thus, in order to generate images that appear to be dynamic or moving, the grayscale values associated with a particular valvelet but included in different image frame signals may vary. In order to assure a more uniform brightness of a particular pixel or image segment, the grayscale value for a particular valvelet may be adjusted accordingly from one image frame signal to the next image frame signal.

Thus, it can be seen from the above description, projection systems and processes for generating images with increased brightness uniformity have been described. While the present invention has been described in terms of the foregoing embodiments, those skilled in the art will recognize that the invention is not limited to the embodiments described. Other embodiments may be practiced with modification and alteration within the spirit and scope of the appended claims. Accordingly, the description is to be regarded as illustrative instead of restrictive.

What is claimed is:

1. In a projection system, a method of operation, comprising:
   receiving a first image signal of an image to be projected on a screen, the first image signal including a first grayscale value for a valvelet of a light valve, wherein the valvelet is configured to generate an image segment to be projected on a screen location of the screen and the first grayscale value associated with a first brightness value;
   determining an adjustment factor for the valvelet based on a brightness value of another screen location, wherein the brightness value of the other screen location is different than the first brightness value;
   adjusting the first grayscale value with the adjustment factor to produce an adjusted first grayscale value, wherein the adjusted first grayscale produces an adjusted first brightness value that is equal to the brightness value of the other location;
   generating a second image signal including the adjusted first grayscale value for the valvelet to increase brightness uniformity of the image to be projected on the screen; and
   controlling the light valve based on the second image signal.

2. The method of claim 1, wherein said first grayscale value is a count associated with a valvelet of the light valve and said adjusting comprises multiplying or dividing the count by the first variable or non-variable adjustment factor.

3. The method of claim 1, wherein the adjustment factor is an adjusted gamma correction.

4. The method of claim 1, wherein said first image signal comprises first image frame signal and the first grayscale value is included in the first image frame signal, said first image signal further comprises a second image frame signal, the second image frame signal including a second grayscale value associated with the valvelet, and the method further comprising adjusting the second grayscale value by applying the adjustment factor to the second grayscale value.

5. The method of claim 1, wherein the method further comprises transmitting the second image signal with the adjusted first grayscale values to a display device containing the light valve.

6. In a projection system, a method of operation, comprising:
   receiving a first image signal of an image to be projected on a screen, the first image signal including a first grayscale value to control a first valvelet of a light valve, the first valvelet is associated with a first screen location of the screen, wherein the first grayscale value is associated with a first brightness value;
   determining an adjustment factor for the first valvelet based on a brightness value of a second screen location, wherein the brightness value of the second screen location is different than the first brightness value;
   adjusting the first grayscale value by applying the adjustment factor to the first grayscale value, wherein the adjusted first grayscale value produces an adjusted first brightness value that is equal to the brightness value of the other location to increase brightness uniformity of the image to be projected on the screen; and
   controlling the first valvelet based on the adjusted first grayscale value.

7. The method of claim 6, wherein the first image signal further comprises a second grayscale value to control a second valvelet of the light valve, the second valvelet is associated with a second screen location of the screen, and the method further comprises adjusting the second grayscale value by applying a second adjustment factor to the second grayscale value, wherein the adjusted second grayscale value produces an adjusted brightness value for the second valvelet that is equal to the brightness value of the other location and controlling the second valvelet based on the adjusted second grayscale value to increase brightness uniformity of the image to be projected on the screen.

8. The method of claim 7, wherein the first and second adjustment factors are unequal.

9. The method of claim 7, wherein said adjusting of the first and second grayscale values are based on dimness associated with the first and second screen locations, the dimness of the first and second screen locations being unequal.

10. The method of claim 6, wherein said controlling comprises generating a second image signal and sending the second image signal to a display device containing the light valve, the second image signal including the adjusted first grayscale value.

11. A rear projection system, comprising:
a display device including a light valve and an illumination arrangement, wherein the illumination arrangement comprises a plurality mirrors configured to direct one or more image signals onto a screen; and
an image processor coupled to the display device, the image processor adapted to receive a first image signal of the image to be projected on the screen, the first image signal including a first grayscale value for a valvelet of the light valve, wherein the valvelet is configured to generate an image segment to be projected on a screen location of the screen via the plurality of mirrors with a first brightness value that corresponds to the first grayscale value, determine an adjustment factor for the valvelet based on a brightness value of another screen location, wherein the brightness value of the other screen location is different than the brightness value, adjust the first gray scale value with adjustment factor to produce an adjusted first grayscale value, wherein the adjusted first grayscale value produces an adjusted first brightness value that is equal to the brightness value of the other location, generate a second image signal including the adjusted first grayscale value for the image segment, and control the light valve contained in the display device based on the second image signal.

12. The projection system of claim 11, wherein said light valve is selected from the group consisting of a digital micromirror device (DMD), a liquid crystal on silicon (LCOS), and a liquid crystal device (LCD).

13. The projection system of claim 11, wherein said display device further comprises a control processor adapted to receive the second image signal from the image process, and control the light valve based on the second image signal received.

14. The projection system of claim 11 further comprising the screen.

15. The projection system of claim 14, wherein said screen comprises a Fresnel lens.

16. The projection system of claim 14, wherein said screen comprises a plurality of screen locations, the plurality of screen locations associated with different dimness.

17. The projection system of claim 11, wherein the adjustment factor is an adjusted gamma correction.

* * * * *

UNITED STATES PATENT AND TRADEMARK OFFICE
CERTIFICATE OF CORRECTION

PATENT NO. : 7,583,325 B2 Page 1 of 1
APPLICATION NO. : 11/089757
DATED : September 1, 2009
INVENTOR(S) : Mark D. Peterson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 942 days.

Signed and Sealed this

Fourteenth Day of September, 2010

David J. Kappos
*Director of the United States Patent and Trademark Office*